United States Patent
Nomura et al.

(10) Patent No.: US 11,171,516 B2
(45) Date of Patent: Nov. 9, 2021

(54) NONCONTACT POWER SUPPLY APPARATUS

(71) Applicant: OMRON Corporation, Kyoto (JP)

(72) Inventors: Atsushi Nomura, Ichinomiya (JP); Goro Nakao, Inazawa (JP); Yusuke Kawai, Ichinomiya (JP); Toshiyuki Zaitsu, Yokohama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/961,281

(22) PCT Filed: Jan. 11, 2019

(86) PCT No.: PCT/JP2019/000726
§ 371 (c)(1),
(2) Date: Jul. 10, 2020

(87) PCT Pub. No.: WO2019/155820
PCT Pub. Date: Aug. 15, 2019

(65) Prior Publication Data
US 2021/0066966 A1    Mar. 4, 2021

(30) Foreign Application Priority Data

Feb. 7, 2018   (JP) .............................. JP2018-020131

(51) Int. Cl.
*H02J 50/12*    (2016.01)
*H02J 50/80*    (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
See application file for complete search history.

(56) References Cited

U.S. PATENT DOCUMENTS 9,276,553 B2 * 3/2016 Suzuki ................. H04B 5/0037
9,561,730 B2 * 2/2017 Widmer ................ B60L 53/126
(Continued)

FOREIGN PATENT DOCUMENTS

JP    2012139033 A    7/2012
JP     201565724 A    4/2015
(Continued)

OTHER PUBLICATIONS

An English translation of the International Search Report ("ISR") of PCT/JP2019/000726 dated Feb. 26, 2019.
(Continued)

*Primary Examiner* — Hal Kaplan
*Assistant Examiner* — Joseph N Inge
(74) *Attorney, Agent, or Firm* — Metrolex IP Law Group, PLLC

(57) ABSTRACT

A power receiver device a noncontact power supply apparatus short-circuits a resonance suppressing coil provided so as to be electromagnetically coupled to a receiver coil and notifies a power transmitter device of an output voltage abnormality when a measured value of output voltage becomes equal to or greater than an upper limit threshold, the measured value of output voltage being obtained by rectifying power received via a resonance circuit including a receiver coil configured to receive power from a transmitter coil of the power transmitter device and a resonance capacitor connected in parallel with the receiver coil. Upon receipt of the notification of the output voltage abnormality, the power transmitter device changes at least one of a voltage and switching frequency of AC power applied to the transmitter coil.

4 Claims, 9 Drawing Sheets

(56) References Cited

U.S. PATENT DOCUMENTS

| | | | | |
|---|---|---|---|---|
| 2015/0236518 A1* | 8/2015 | Matsumoto | ............ | H02J 50/80 |
| | | | | 307/104 |
| 2015/0280455 A1* | 10/2015 | Bosshard | ............ | H02J 7/00712 |
| | | | | 307/104 |
| 2016/0118805 A1* | 4/2016 | Swope | ................... | H02J 50/80 |
| | | | | 307/104 |
| 2016/0352155 A1* | 12/2016 | Iwasaki | ................ | H02J 50/10 |
| 2018/0090995 A1* | 3/2018 | Arasaki | ............... | B60L 53/122 |

FOREIGN PATENT DOCUMENTS

| | | | |
|---|---|---|---|
| JP | 2015065724 A | * | 4/2015 |
| JP | 2015173587 A | | 10/2015 |
| WO | 2016/159093 A1 | | 10/2016 |

OTHER PUBLICATIONS

The Written Opinion("WO") of PCT/JP2019/000726 dated Feb. 26, 2019.

* cited by examiner

NONCONTACT POWER SUPPLY APPARATUS

TECHNICAL FIELD

The present invention relates to a noncontact power supply apparatus.

BACKGROUND ART

Research has been conducted on a so-called noncontact power supply (also called wireless power supply) technology of transmitting power across space without using metal contacts or the like.

In a power supply apparatus using the noncontact power supply technology (hereinafter, simply referred to as a noncontact power supply apparatus), when a positional relationship between a primary side (power-transmitter side) coil and a secondary side (power-receiver side) coil changes, a degree of coupling between the two coils changes accordingly. As a result, an output voltage from a power-receiver side device to a load circuit also changes. In some cases, the output voltage to the load circuit may excessively increase, thereby causing the power-receiver side device, the load circuit, or the like to fail. Therefore, a technique of preventing an output voltage from excessively increasing has been proposed (see, for example, Patent Documents 1 and 2).

For example, Patent Document 1 discloses a proposal of a method for suppressing resonance action with a resonance suppressing circuit provided on a power-receiver side, the resonance suppressing circuit including a control coil magnetically coupled to a power receiver resonance coil, by switching, while monitoring an output voltage, the control coil to a short-circuited or opened state. Further, Patent Document 2 discloses a proposal of a configuration where, in a power receiver device including a power receiver antenna and rectifying circuit of a noncontact power transmission system, the power receiver antenna includes a power receiver coil, a resonance coil electromagnetically coupled to the power receiver coil, an adjusting coil electromagnetically coupled to the resonance coil, and a unit configured to switch impedances of the adjusting coil.

PRIOR ART DOCUMENTS

Patent Documents

Patent Document 1: Japanese Unexamined Patent Publication No. 2015-65724
Patent Document 2: Japanese Unexamined Patent Publication No. 2012-139033

SUMMARY OF THE INVENTION

Problems To Be Solved by the Invention

However, in the technique disclosed in Patent Document 1 and the technique disclosed in Patent Document 2, when a degree of coupling between a power-transmitter side coil and a power-receiver side coil has no change, suppression of resonance between the power-transmitter side coil and the power-receiver side coil in response to an increase in output voltage and termination of the suppression of resonance in response to a reduction in the output voltage are repeated. This causes a power-transmitter side device to continue to transmit power even though a period in which the power transmission is interrupted occurs intermittently. Further, the power factor is reduced due to a short circuit in a coil provided so as to be electromagnetically coupled to the power-receiver side coil. This in turn makes power transmission efficiency low and makes energy loss accompanying power transmission larger.

It is therefore an object of the present invention to provide a noncontact power supply apparatus configured to suppress energy loss while suppressing an excessive increase in output voltage from a power-receiver side device.

Means for Solving the Problem

Provided according to one aspect of the present invention is a noncontact power supply apparatus including a power transmitter device and a power receiver device to which the power transmitter device transmits power in a noncontact manner. In this noncontact power supply apparatus, the power transmitter device includes a transmitter coil configured to supply power to the power receiver device, a power supply circuit configured to supply AC power to the transmitter coil and adjust at least one of a switching frequency and voltage of the AC power supplied to the transmitter coil, a first transceiver configured to receive an output voltage abnormality signal from the power receiver device, and a control circuit configured to change, when the first transceiver receives the output voltage abnormality signal, at least one of the switching frequency and voltage of the AC power supplied from the power supply circuit to the transmitter coil. Further, the power receiver device includes a resonance circuit including a receiver coil configured to receive the power from the power transmitter device and a resonance capacitor connected in parallel with the receiver coil, a rectifying circuit configured to rectify the power received via the resonance circuit, a resonance suppressing coil disposed so as to be electromagnetically coupled to the receiver coil, a switch circuit connected to the resonance suppressing coil, the switch circuit being configured to switch the resonance suppressing coil to a short-circuited or opened state, a voltage detection circuit configured to measure an output voltage of power output from the rectifying circuit to obtain a measured value of the output voltage, a second transceiver configured to communicate with the first transceiver, and a determination circuit configured to control the switch circuit to short-circuit the resonance suppressing coil and cause the second transceiver to transmit the output voltage abnormality signal when the measured value of the output voltage becomes equal to or greater than a predetermined upper limit threshold. Having such a configuration, the noncontact power supply apparatus according to the present invention can suppress energy loss while suppressing an excessive increase in output voltage from a power-receiver side device.

In this noncontact power supply apparatus, the determination circuit of the power receiver device controls the switch circuit to open the resonance suppressing coil when the control circuit of the power transmitter device starts to change at least one of the switching frequency and voltage of the AC power. This allows the noncontact power supply apparatus to search for a switching frequency and voltage at which the transmitter coil can efficiently transfer power while preventing the power receiver device or a load circuit connected to the power receiver device from failing due to an excessive increase in the output voltage.

Further, the power receiver device preferably further includes a coil connected between the resonance circuit and the rectifying circuit. In such a configuration, the control circuit of the power transmitter device preferably controls, when the first transceiver receives the output voltage abnormality signal, the switching frequency of the AC power supplied from the power supply circuit to the transmitter coil so as to prevent the measured value of the output voltage from changing in response to a change in resistance of a load circuit connected to the rectifying circuit of the power receiver device. This allows the noncontact power supply apparatus to resume constant voltage output action by controlling the switching frequency even when the output voltage temporarily increases.

MODE FOR CARRYING OUT THE INVENTION

Hereinafter, a noncontact power supply apparatus according to an embodiment of the present invention will be described with reference to the drawings. In this noncontact power supply apparatus, a power-receiver side device includes a receiver coil for receiving power, and a coil for suppressing resonance (hereinafter, simply referred to as a resonance suppressing coil) provided so as to be electromagnetically coupled to the receiver coil. Then, when an output voltage from the power-receiver side device becomes equal to or greater than a predetermined threshold, the power-receiver side device short-circuits the resonance suppressing coil to change a resonance condition of a resonance circuit including the receiver coil, and notifies a power-transmitter side device of the fact that the output voltage becomes equal to or greater than the predetermined threshold. Upon receipt of the notification, the power-transmitter side device controls a frequency and voltage of AC power applied to a power-transmitter side transmitter coil to adjust the voltage output from the power-receiver side device to a predetermined voltage. That is, the noncontact power supply apparatus controls the frequency and voltage of the AC power applied to the power-transmitter side transmitter coil so as to maintain constant voltage output action. Further, the power-receiver side device maintains the resonance suppressing coil in the short-circuited state until control on the frequency and voltage of the AC power applied to the transmitter coil are started. Accordingly, the noncontact power supply apparatus suppresses an excessive increase in the output voltage from the power-receiver side device and allows continuous power transmission while suppressing energy loss.

Figure 1:
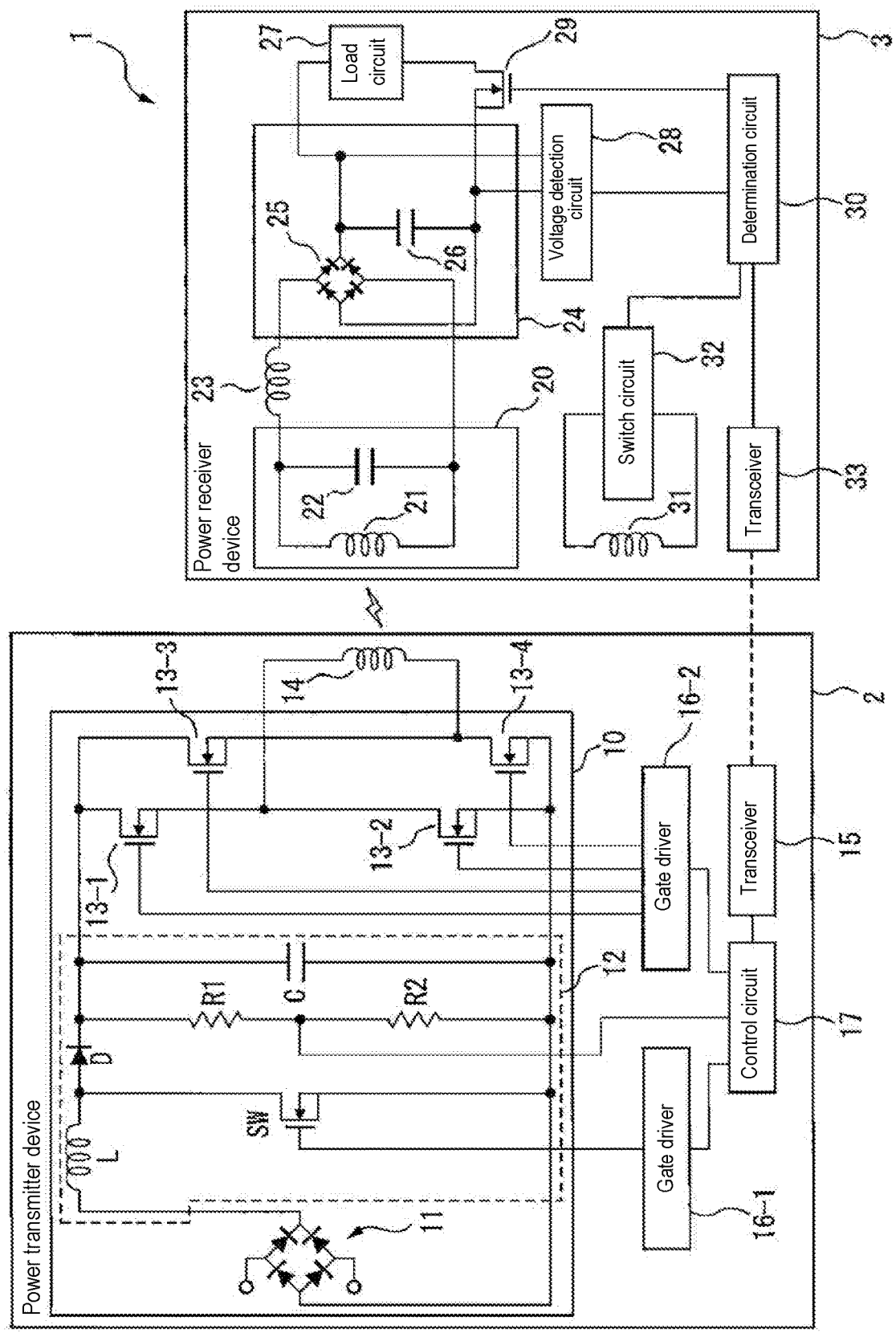
FIG. 1 is a schematic structure diagram of a noncontact power supply apparatus according to an embodiment of the present invention.

FIG. 1 is a schematic structure diagram of the noncontact power supply apparatus according to the embodiment of the present invention. As shown in FIG. 1, the noncontact power supply apparatus 1 includes a power transmitter device 2 and a power receiver device 3 to which the power transmitter device 2 transmits power across space in a noncontact manner. The power transmitter device 2 includes a power supply circuit 10, a transmitter coil 14, a transceiver 15, gate drivers 16-1, 16-2, and a control circuit 17. On the other hand, the power receiver device 3 includes a resonance circuit 20 including a receiver coil 21 and a resonance capacitor 22, a coil 23, a rectifying and smoothing circuit 24, a load circuit 27, a voltage detection circuit 28, a switching element 29, a determination circuit 30, a resonance suppressing coil 31, a switch circuit 32, and a transceiver 33.

First, a description will be given of the power transmitter device 2. The power supply circuit 10 supplies the transmitter coil 14 with AC power having an adjustable switching frequency and an adjustable voltage. Therefore, the power supply circuit 10 includes a power supply 11, a power factor correction circuit 12, and four switching elements 13-1 to 13-4.

The power supply 11 supplies power having a predetermined pulsating voltage. Therefore, the power supply 11 is connected to a commercial AC power supply and includes a full-wave rectifying circuit for rectifying AC power supplied from the AC power supply.

The power factor correction circuit 12 converts a voltage of the power output from the power supply 11 into a voltage suitable for control of the control circuit 17 and outputs the voltage. Therefore, the power factor correction circuit 12 includes, for example, a coil L and a diode D connected in series in this order from a positive electrode terminal of the power supply 11, a switching element SW that is an n-channel MOSFET having a drain terminal connected between the coil L and the diode D and having a source terminal connected to a negative electrode terminal of the power supply 11, and a smoothing capacitor C connected in parallel with the switching element SW with the diode D interposed between the switching element SW and the smoothing capacitor C. Further, the switching element SW has a gate terminal connected to the gate driver 16-1. Further, the power factor correction circuit 12 includes two resistors R1, R2 connected in series between the positive electrode terminal and negative electrode terminal of the power supply 11. The resistors R1, R2 are connected between the diode D and the smoothing capacitor C in parallel with the smoothing capacitor C. Then, a voltage between the resistors R1, R2 is measured by the control circuit 17 as representing a voltage output from the diode D.

The power factor correction circuit 12 takes power factor correction action by causing the gate driver 16-1 to switch the switching element SW to an on or off state in accordance with a duty cycle given by the control circuit 17 and such that the current output from the diode D coincides in waveform with the voltage supplied from the power supply 11. The higher the duty cycle at which the switching element SW is in the on state, the higher the voltage output from the diode D.

The voltage output from the diode D is smoothed by the smoothing capacitor C and supplied to the transmitter coil 14 via the four switching elements 13-1 to 13-4.

Note that the power factor correction circuit 12 is not limited to the above-described configuration and may have another configuration where the output voltage can be adjusted under the control of the control circuit 17.

The four switching elements 13-1 to 13-4 may be, for example, n-channel MOSFETs. Among the four switching elements 13-1 to 13-4, the switching element 13-1 and the switching element 13-2 are connected in series between the positive electrode terminal and negative electrode terminal of the power supply 11 via the power factor correction circuit 12. Further, according to the embodiment, the switching element 13-1 is connected to the positive electrode of the power supply 11, and the switching element 13-2 is connected to the negative electrode of the power supply 11. The switching element 13-1 has a drain terminal connected to the positive electrode terminal of the power supply 11 via the power factor correction circuit 12 and has a source terminal connected to a drain terminal of the switching element 13-2. Further, the switching element 13-2 has a source terminal connected to the negative electrode terminal of the power supply 11 via the power factor correction circuit 12. Furthermore, the source terminal of the switching element 13-1 and the drain terminal of the switching element 13-2 are connected to one end of the transmitter coil 14, and the source terminal of the switching element 13-2 is connected to the other end of the transmitter coil 14 via the switching element 13-4.

Similarly, among the four switching elements 13-1 to 13-4, the switching element 13-3 and the switching element 13-4 are connected in parallel with the switching element 13-1 and the switching element 13-2 and in series between the positive electrode terminal and negative electrode terminal of the power supply 11 via the power factor correction circuit 12. Further, the switching element 13-3 is connected to the positive electrode of the power supply 11, and the switching element 13-4 is connected to the negative electrode of the power supply 11. The switching element 13-3 has a drain terminal connected to the positive electrode terminal of the power supply 11 via the power factor correction circuit 12 and has a source terminal connected to a drain terminal of the switching element 13-4. Further, the switching element 13-4 has a source terminal connected to the negative electrode terminal of the power supply 11 via the power factor correction circuit 12. Furthermore, the source terminal of the switching element 13-3 and the drain terminal of the switching element 13-4 are connected to the other end of the transmitter coil 14.

Further, the switching elements 13-1 to 13-4 have their respective gate terminals connected to the control circuit 17 via the gate driver 16-2. Furthermore, the switching elements 13-1 to 13-4 may have their respective gate terminals connected via resistors to their respective source terminals so as to ensure that each switching element is brought into the on state when a voltage that brings the switching element into the on state is applied. Then, the switching elements 13-1 to 13-4 are each switched to the on or off state at an adjustable switching frequency in accordance with a control signal from the control circuit 17. According to the embodiment, a pair of the switching element 13-1 and the switching element 13-4 and a pair of the switching element 13-2 and the switching element 13-3 are alternately switched to the on or off state such that while the switching element 13-1 and the switching element 13-4 are in the on state, the switching element 13-2 and the switching element 13-3 are in the off state, whereas, while the switching element 13-2 and the switching element 13-3 are in the on state, the switching element 13-1 and the switching element 13-4 are in the off state. This causes DC power supplied from the power supply 11 via the power factor correction circuit 12 to be converted into AC power having a switching frequency of each of the switching elements and supplied to the transmitter coil 14.

Then, the transmitter coil 14 transmits the AC power supplied from the power supply circuit 10 to the resonance circuit 20 of the power receiver device 3 across space.

Each time the transceiver 15 receives a radio signal from the transceiver 33 of the power receiver device 3, the transceiver 15 extracts, from the radio signal, abnormal voltage occurrence information representing that the output voltage from the rectifying and smoothing circuit 24 of the power receiver device 3 has excessively increased or determination information representing whether the noncontact power supply apparatus 1 is in the constant voltage output action and outputs such information to the control circuit 17. Therefore, the transceiver 15 includes, for example, an antenna that receives the radio signal in accordance with a predetermined radio communication standard, and a transceiver circuit that demodulates the radio signal. Note that the predetermined radio communication standard may be, for example, ISO/IEC 15693, ZigBee (registered trademark), or Bluetooth (registered trademark).

The gate driver 16-1 receives, from the control circuit 17, a control signal for switching the switching element SW of the power factor correction circuit 12 to the on or off state and change a voltage to be applied to the gate terminal of the switching element SW in accordance with the control signal. That is, upon receipt of a control signal for bringing the switching element SW into the on state, the gate driver 16-1 applies, to the gate terminal of the switching element SW, a relatively high voltage that brings the switching element SW into the on state. On the other hand, upon receipt of a control signal for bringing the switching element SW to the off state, the gate driver 16-1 applies, to the gate terminal of the switching element SW, a relatively low voltage that brings the switching element SW into the off state. This causes the gate driver 16-1 to switch the switching element SW of the power factor correction circuit 12 to the on or off state in synchronization with timings given by the control circuit 17.

The gate driver 16-2 receives, from the control circuit 17, a control signal for switching each of the switching elements 13-1 to 13-4 to the on or off state and changes a voltage to be applied to a corresponding one of the switching elements 13-1 to 13-4 in accordance with the control signal. That is, upon receipt of a control signal for bringing the switching element 13-1 and the switching element 13-4 into the on state, the gate driver 16-2 applies, to the gate terminal of the switching element 13-1 and the gate terminal of the switching element 13-4, a relatively high voltage that brings the switching element 13-1 and the switching element 13-4 into the on state. This allows a current from the power supply 11 to flow through the switching element 13-1, the transmitter coil 14, and the switching element 13-4. On the other hand, upon receipt of a control signal for bringing the switching element 13-1 and the switching element 13-4 into the off state, the gate driver 16-2 applies, to the gate terminal of the switching element 13-1 and the gate terminal of the switching element 13-4, a relatively low voltage that brings the switching element 13-1 and the switching element 13-4 into the off state to interrupt the current flowing from the power supply 11 through the switching element 13-1 and the switching element 13-4. Similarly, the gate driver 16-2 controls a voltage to be applied to the gate terminals of the switching elements 13-2 and 13-3. Therefore, when the switching element 13-1 and the switching element 13-4 are brought into the off state, and the switching element 13-2 and the switching element 13-3 are brought into the on state, the current from the power supply 11 is allowed to flow through the switching element 13-3, the transmitter coil 14, and the switching element 13-2.

The control circuit 17 includes, for example, a non-volatile memory circuit and a volatile memory circuit, an operation circuit, and an interface circuit for use in connection to another circuit. Upon receipt of the abnormal voltage occurrence information from the transceiver 15, the control circuit 17 starts to control the switching frequency and voltage of the AC power supplied from the power supply circuit 10 to the transmitter coil 14. Subsequently, each time the control circuit 17 receives the determination information from the transceiver 15, the control circuit 17 controls the switching frequency and voltage of the AC power supplied from the power supply circuit 10 to the transmitter coil 14 in accordance with the determination information.

Therefore, according to the embodiment, the control circuit 17 controls each of the switching elements 13-1 to 13-4 such that the pair of the switching element 13-1 and the switching element 13-4 and the pair of the switching element 13-2 and the switching element 13-3 are alternately brought into the on state, and a period in which the pair of switching element 13-1 and the switching element 13-4 are in the on state coincides with a period in which the pair of switching element 13-2 and the switching element 13-3 are in the on state within one cycle of the switching frequency. Note that the control circuit 17 may have a dead time during which both the pair of the switching element 13-1 and the switching element 13-4 and the pair of the switching element 13-2 and the switching element 13-3 are in the off state when the pair of the switching element 13-1 and the switching element 13-4 and the pair of the switching element 13-2 and the switching element 13-3 are switched to the on or off state so as to prevent the power supply 11 from being short-circuited due to that both the pair of the switching element 13-1 and the switching element 13-4 and the pair of the switching element 13-2 and the switching element 13-3 are brought into the on state at the same time.

Further, the control circuit 17 refers to a reference table showing a relationship between a switching frequency and a duty cycle at which the switching element SW of the power factor correction circuit 12 is controlled to be switched to the on or off state, the duty cycle corresponding to a voltage that is applied to the transmitter coil 14 to enable constant voltage output at the switching frequency, to select the duty cycle in accordance with the switching frequency. Then, the control circuit 17 determines a timing at which the switching element SW is switched to the on or off state in accordance with the duty cycle and a change in the output voltage from the diode D of the power factor correction circuit 12, and outputs a control signal representing the timing to the gate driver 16-1.

Further, when the transceiver 15 fails to receive the radio signal from the power receiver device 3, it is assumed that the power receiver device 3 is not located at a position where the power receiver device 3 is able to receive power supplied from the power transmitter device 2, that is, the power transmitter device 2 is in a standby state. Therefore, in such a case, the control circuit 17 may set, to an allowable minimum cycle, the duty cycle at which the switching element SW is controlled to be switched to the on or off state. Accordingly, while the power transmitter device 2 is in the standby state, the voltage applied to the transmitter coil 14 also becomes an allowable minimum voltage, thereby suppressing energy loss.

Note that the control of the control circuit 17 over the switching frequency and the voltage applied to the transmitter coil 14 will be described in detail later.

Next, a description will be given of the power receiver device 3. The resonance circuit 20 is an LC resonance circuit including the receiver coil 21 and the resonance capacitor 22 connected in parallel with each other. The receiver coil 21 included in the resonance circuit 20 has one end connected to one end of the resonance capacitor 22 and also connected to one input terminal of the rectifying and smoothing circuit 24 via the coil 23. The receiver coil 21 has the other end connected to the other end of the resonance capacitor 22 and also connected to the other input terminal of the rectifying and smoothing circuit 24.

The receiver coil 21 receives power from the transmitter coil 14 by resonating with an alternating current flowing through the transmitter coil 14 of the power transmitter device 2. Then, the receiver coil 21 outputs the power thus received to the rectifying and smoothing circuit 24 via the resonance capacitor 22 and the coil 23. Note that the receiver coil 21 and the transmitter coil 14 of the power transmitter device 2 may be the same or different in the number of turns.

The resonance capacitor 22 has one end connected to the one end of the receiver coil 21 and the coil 23 and has the other end connected to the other end of the receiver coil 21 and the rectifying and smoothing circuit 24. The resonance capacitor 22 outputs the power received by the receiver coil 21 to the rectifying and smoothing circuit 24 via the coil 23.

The coil 23 is connected between the resonance circuit 20 and the rectifying and smoothing circuit 24. According to the embodiment, the coil 23 has one end connected to the receiver coil 21 and resonance capacitor 22 of the resonance circuit 20 so as to be in series with the receiver coil 21 and has the other end connected to the rectifying and smoothing circuit 24. The coil 23 outputs the power from the resonance circuit 20 to the rectifying and smoothing circuit 24. Note that the coil 23 provided as described above reduces harmonic components of the received power.

The rectifying and smoothing circuit 24 is an example of a rectifying circuit and includes a full-wave rectifying circuit 25 including four bridge-connected diodes and a smoothing capacitor 26. The rectifying and smoothing circuit 24 receives power via the coil 23, the power being received by the resonance circuit 20, and converts the power into DC power by rectifying and smoothing the power. Then, the rectifying and smoothing circuit 24 outputs the DC power to the load circuit 27.

The voltage detection circuit 28 measures an output voltage across both terminals of the rectifying and smoothing circuit 24 at predetermined intervals. The output voltage across both the terminals of the rectifying and smoothing circuit 24 corresponds to the output voltage of the resonance circuit 20 on a one-to-one basis; therefore, a measured value of the output voltage across both the terminals of the rectifying and smoothing circuit 24 indirectly represents a measured value of the output voltage of the resonance circuit 20. The voltage detection circuit 28 may be, for example, any of various known voltage detection circuits configured to detect a DC voltage. Then, the voltage detection circuit 28 outputs a voltage detection signal representing the measured value of the output voltage to the determination circuit 30.

The switching element 29 is, for example, a MOSFET and is connected between the rectifying and smoothing circuit 24 and the load circuit 27. The switching element 29 is brought into the off state to interrupt a current flowing from the rectifying and smoothing circuit 24 to the load circuit 27, whereas, the switching element 29 is brought into the on state to allow a current to flow from the rectifying and smoothing circuit 24 to the load circuit 27.

The determination circuit 30 determines whether the measured value of the output voltage received from the voltage detection circuit 28 is equal to or greater than a predetermined upper limit threshold. When the measured value is equal to or greater than the upper limit threshold, the determination circuit 30 controls the switch circuit 32 to short-circuit the resonance suppressing coil 31 and notifies the transceiver 33 that the measured value of the output voltage is equal to or greater than the upper limit threshold, that is, the output voltage has excessively increased. Accordingly, the determination circuit 30 changes a resonance frequency of the resonance circuit 20 as soon as the measured value of the output voltage reaches the upper limit threshold to reduce the power transmitted between the power transmitter device 2 and the power receiver device 3, thereby allowing the output voltage from the resonance circuit 20 to be reduced. Note that the upper limit threshold may be an upper limit value of a voltage up to which neither the load circuit 27 nor the power receiver device 3 fails, or a value obtained by subtracting a predetermined offset value from the upper limit value.

Furthermore, the determination circuit 30 determines whether the measured value of the output voltage is within an allowable voltage range when the constant voltage output action is active while the switching frequency and voltage of the AC power applied to the transmitter coil 14 are being controlled. Then, the determination circuit 30 notifies the transceiver 33 of the determination result. Note that the upper limit of the allowable voltage range is preferably equal to or less than the above-described upper limit threshold.

Therefore, the determination circuit 30 includes, for example, a memory circuit that stores the allowable voltage range, an operation circuit that compares the measured value of the output voltage with each of the upper limit threshold and the allowable voltage range, and a control circuit that switches the switching element 29 and the switch circuit 32 to the on or off state. Note that the determination circuit 30 may include a circuit similar to the circuit used to switch the control coil to the on or off state disclosed in Patent Document 1, as a circuit that switches the switch circuit 32 to the on or off state in accordance with the result of comparison between the measured value of the output voltage and the upper limit threshold made by the determination circuit 30. In this case, the voltage that brings the switch circuit 32 into the on state may be set lower than the voltage that brings the switch circuit 32 into the off state.

Further, the determination circuit 30 switches the switching element 29 to the on or off state in a predetermined period while the measured value of the output voltage is out of the allowable voltage range. This causes a resistance value of the entire circuit including the load circuit 27 connected to the rectifying and smoothing circuit 24 to change in the predetermined period. This in turn allows the determination circuit 30 to determine whether the measured value of the output voltage is approximately constant while switching the switching element 29 to the on or off state to determine whether the noncontact power supply apparatus 1 is in the constant voltage output action. Therefore, while the measured value of the output voltage is approximately constant even when the switching element 29 is switched to the on or off state in the predetermined period, the determination circuit 30 notifies the transceiver 33 that the noncontact power supply apparatus 1 is in the constant voltage output action.

Further, the determination circuit 30 stops switching the switching element 29 to the on or off state when the measured value of the output voltage is approximately constant, that is, the noncontact power supply apparatus 1 is in the constant voltage output action for a fixed period longer than the predetermined period to maintain the switching element 29 in the on state. Then, the determination circuit 30 determines whether the measured value of the output voltage is within the allowable voltage range and notifies the transceiver 33 of the determination result.

At this time, the determination circuit 30 notifies, when the measured value of the output voltage is within the allowable voltage range for the fixed period longer than the predetermined period, the transceiver 33 of the determination result representing that the noncontact power supply apparatus 1 is in the constant voltage output action and the measured value of the output voltage is within the allowable voltage range.

Note that, according to a modification, the determination circuit 30 may include a resistor connected in parallel with the load circuit 27 with respect to the rectifying and smoothing circuit 24. In this case, the switching element 29 may be provided in series with the resistor and in parallel with the load circuit 27. In this case, the determination circuit 30 maintains the switching element 29 in the off state while the measured value of the output voltage is within the allowable voltage range. On the other hand, when the measured value of the output voltage falls out of the allowable voltage range, the determination circuit 30 may switch the switching element 29 to the on or off state in the predetermined period, as in the above-described embodiment. According to this modification, the power is kept being supplied to the load circuit 27 even while the noncontact power supply apparatus 1 is out of the constant voltage output action.

According to another modification, a second switching element such as a MOSFET may be provided in parallel with the above-described resistor and in series with the load circuit 27. In this case, while the measured value of the output voltage is within the allowable voltage range, the determination circuit 30 brings the second switching element into the on state to enable the power supply to the load circuit 27. On the other hand, when the measured value of the output voltage falls out of the allowable voltage range, the determination circuit 30 may bring the second switching element into the off state to interrupt the power supply to the load circuit 27. This prevents, even when the voltage of the received power becomes excessively high while the switching frequency is in adjustment by the power transmitter device 2, the excessively high voltage from being applied to the load circuit 27.

The resonance suppressing coil 31 is provided so as to be electromagnetically coupled to the receiver coil 21 of the resonance circuit 20. For example, the resonance suppressing coil 31 and the receiver coil 21 are wound around the same core. Further, both ends of the resonance suppressing coil 31 are each connected to the switch circuit 32. When the resonance suppressing coil 31 is short-circuited by the switch circuit 32, the resonance suppressing coil 31 is electromagnetically coupled to the receiver coil 21, thereby changing the resonance frequency of the resonance circuit 20. Therefore, even when the output voltage from the resonance circuit 20 excessively increases, the resonance suppressing coil 31 is short-circuited to reduce the power transmitted from the power transmitter device 2 to the power receiver device 3, and the output voltage from the resonance circuit 20 is reduced accordingly. Note that the receiver coil 21 and the resonance suppressing coil 31 may be the same or different in the number of turns.

On the other hand, when the switch circuit 32 opens both the ends of the resonance suppressing coil 31, the resonance suppressing coil 31 is prevented from being involved in the resonance between the transmitter coil 14 and the receiver coil 21 and does not affect the power transmission from the power transmitter device 2 to the power receiver device 3 accordingly.

The switch circuit 32 is connected to both the ends of the resonance suppressing coil 31 and switches the resonance suppressing coil 31 to a short-circuited or opened state in accordance with a control signal from the determination circuit 30. That is, the switch circuit 32 maintains the resonance suppressing coil 31 in the short-circuited state while receiving the control signal indicating the on state from the determination circuit 30. On the other hand, the switch circuit 32 maintains both the ends of the resonance suppressing coil 31 in the opened state while receiving the control signal indicating the off state from the determination circuit 30.

FIGS. 2A to 2D are diagrams each showing an example of the switch circuit 32. In the example shown in FIG. 2A, the switch circuit 32 includes a relay. When the determination circuit 30 brings the relay into the on state, the resonance suppressing coil 31 is short-circuited. On the other hand, when the determination circuit 30 brings the relay into the off state, both the ends of the resonance suppressing coil 31 are opened.

Figure 2A:
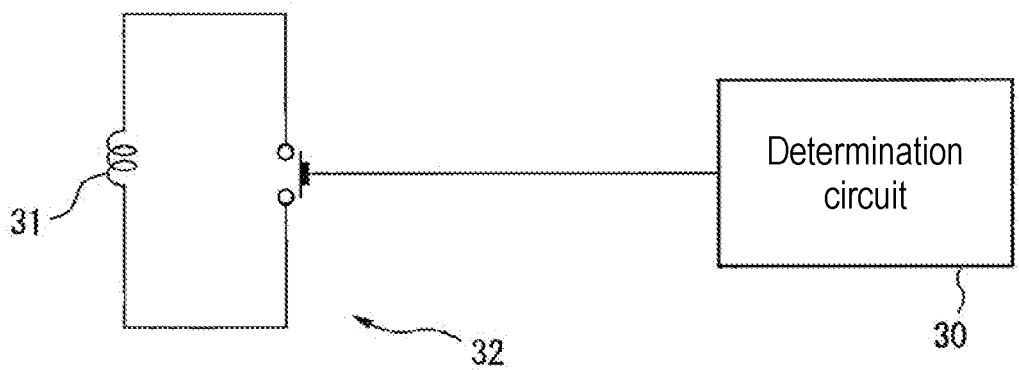
FIG. 2A is a diagram showing an example of a switch circuit.
Figure 2B:
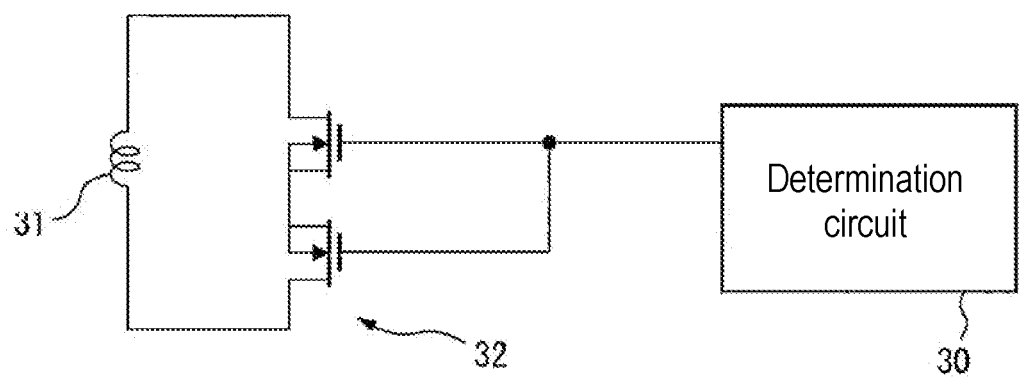
FIG. 2B is a diagram showing an example of the switch circuit.

In the example shown in FIG. 2B, the switch circuit 32 includes two n-channel MOSFETs connected in series between both the ends of the resonance suppressing coil 31. The two MOSFETs are arranged such that their respective source terminals are connected to each other, and their respective drain terminals are each connected to a corresponding one of the ends of the resonance suppressing coil 31. The two MOSFETs have their respective gate terminals connected to the determination circuit 30. When the determination circuit 30 applies, to the gate terminals of the two MOSFETs, a relatively high voltage corresponding to the control signal indicating the on state, a current is allowed to flow between the source and drain of each of the MOSFETs, thereby short-circuiting the resonance suppressing coil 31. On the other hand, when the determination circuit 30 applies, to the gate terminals of the two MOSFETs, a relatively low voltage corresponding to the control signal indicating the off state, no current flows between the source and drain of each of the MOSFETs, and, in addition, body diodes of the two MOSFETs are opposite to each other, thereby preventing a current from flowing through the body diodes. Therefore, both the ends of the resonance suppressing coil 31 are opened.

Figure 2C:
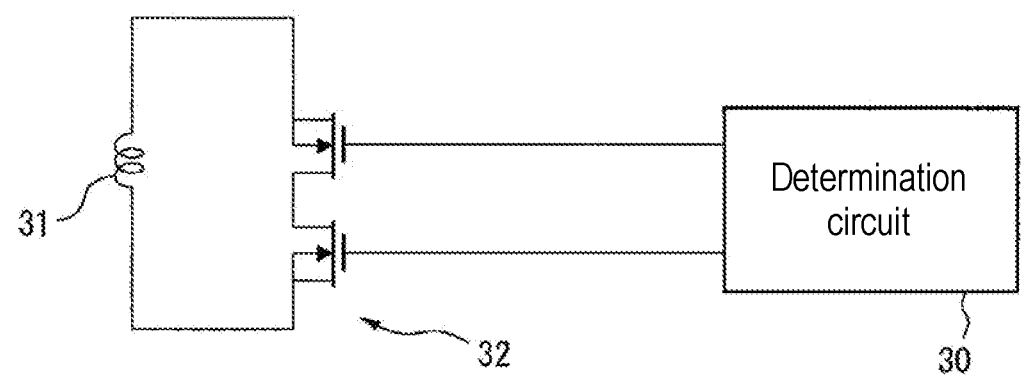
FIG. 2C is a diagram showing an example of the switch circuit.

In the example shown in FIG. 2C, as in the example shown in FIG. 2B, the switch circuit 32 includes two n-channel MOSFETs connected in series between both the ends of the resonance suppressing coil 31. However, in the example shown in FIG. 2C, the two MOSFETs are arranged such that their respective drain terminals are connected to each other, and their respective source terminals are each connected to a corresponding one of the ends of the resonance suppressing coil 31. In this example as well, when the determination circuit 30 applies, to the gate terminals of the two MOSFETs, a relatively high voltage corresponding to the control signal indicating the on state, the resonance suppressing coil 31 is short-circuited. On the other hand, when the determination circuit 30 applies, to the gate terminals of the two MOSFETs, a relatively low voltage corresponding to the control signal indicating the off state, both the ends of the resonance suppressing coil 31 are opened.

Figure 2D:
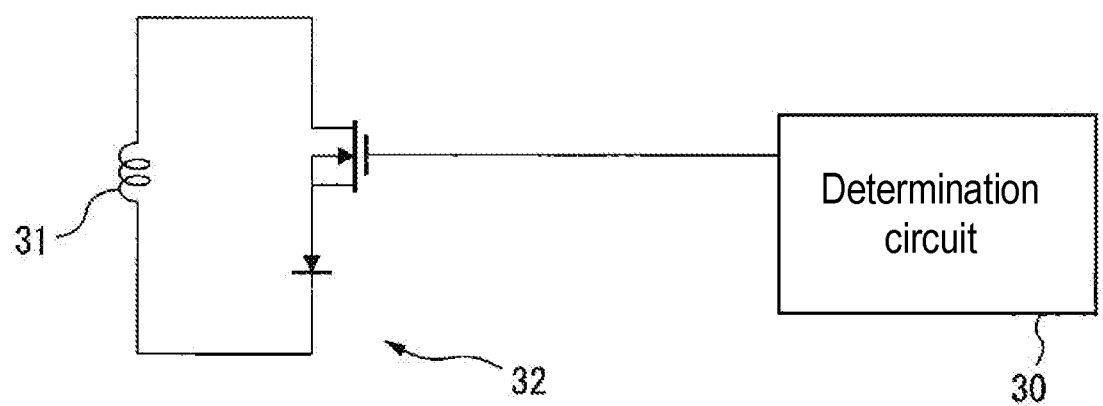
FIG. 2D is a diagram showing an example of the switch circuit.

In the example shown in FIG. 2D, the switch circuit 32 includes an n-channel MOSFET and a diode connected in series between both the ends of the resonance suppressing coil 31. The MOSFET has a drain terminal connected to one end of the resonance suppressing coil 31 and has a source terminal connected to an anode terminal of the diode. The MOSFET has a gate terminal connected to the determination circuit 30. The diode has a cathode terminal connected to the other end of the resonance suppressing coil 31. In this example as well, when the determination circuit 30 applies, to the gate terminal of the MOSFET, a voltage corresponding to the control signal indicating the on state, the resonance suppressing coil 31 is short-circuited. On the other hand, when the determination circuit 30 applies, to the gate terminal of the MOSFET, a voltage corresponding to the control signal indicating the off state, both the ends of the resonance suppressing coil 31 are opened. In this example, even when the MOSFET is brought into the on state, a current flowing from the diode toward the MOSFET is interrupted; therefore, during a half of each cycle of an alternating current flowing through the resonance suppressing coil 31, the resonance suppressing coil is 31 does not affect the resonance of the resonance circuit 20. However, even in this case, the power transmitted from the power transmitter device 2 to the power receiver device 3 is reduced, so that the output voltage from the resonance circuit 20 is reduced.

Upon receipt of a notification from the determination circuit 30 that the measured value of the output voltage becomes equal to or greater than the upper limit threshold, the transceiver 33 generates a radio signal containing the abnormal voltage occurrence information representing contents of the notification, and transmits the radio signal to the transceiver 15 of the power transmitter device 2. Further, the transceiver 33 generates, in accordance with the determination result received from the determination circuit 30, a radio signal containing the determination information representing whether the noncontact power supply apparatus 1 is in the constant voltage output action and whether the measured value of the output voltage is within the allowable voltage range at predetermined transmission intervals until the constant voltage output action is resumed after the measured value of the output voltage becomes equal to or greater than the upper limit threshold, and transmits the radio signal to the transceiver 15 of the power transmitter device 2. Therefore, the transceiver 33 includes, for example, a transceiver circuit that generates a radio signal in accordance with a predetermined radio communication standard, and an antenna that outputs the radio signal. Note that the predetermined radio communication standard may be, for example, ISO/IEC 15693, ZigBee (registered trademark), or Bluetooth (registered trademark), as in the transceiver 15.

A detailed description will be given below of the operation of the noncontact power supply apparatus 1.

According to the embodiment, upon receipt of the abnormal voltage occurrence information from the transceiver 15, the control circuit 17 of the power transmitter device 2 starts to adjust the switching frequency and voltage of the AC power supplied to the transmitter coil 14 so as to enable the noncontact power supply apparatus 1 to take the constant voltage output action. Then, the control circuit 17 adjusts, based on the determination information received from the transceiver 15, the switching frequency and voltage of the AC power supplied from the power supply circuit 10 to the transmitter coil 14 until the noncontact power supply apparatus 1 resumes the constant voltage output action.

Here, the noncontact power supply apparatus according to the embodiment does not utilize resonance on the power-transmitter side. Therefore, the output voltage of the noncontact power supply apparatus 1 is similar in frequency characteristics to an output voltage of a so-called SPL noncontact power supply apparatus provided with a reactor connected in series to a coil of a resonance circuit on a power-receiver side when a capacitance of a capacitor connected in series with a transmitter coil is increased, and a resonance frequency of a resonance circuit on a power-transmitter side is lowered.

Figure 3:
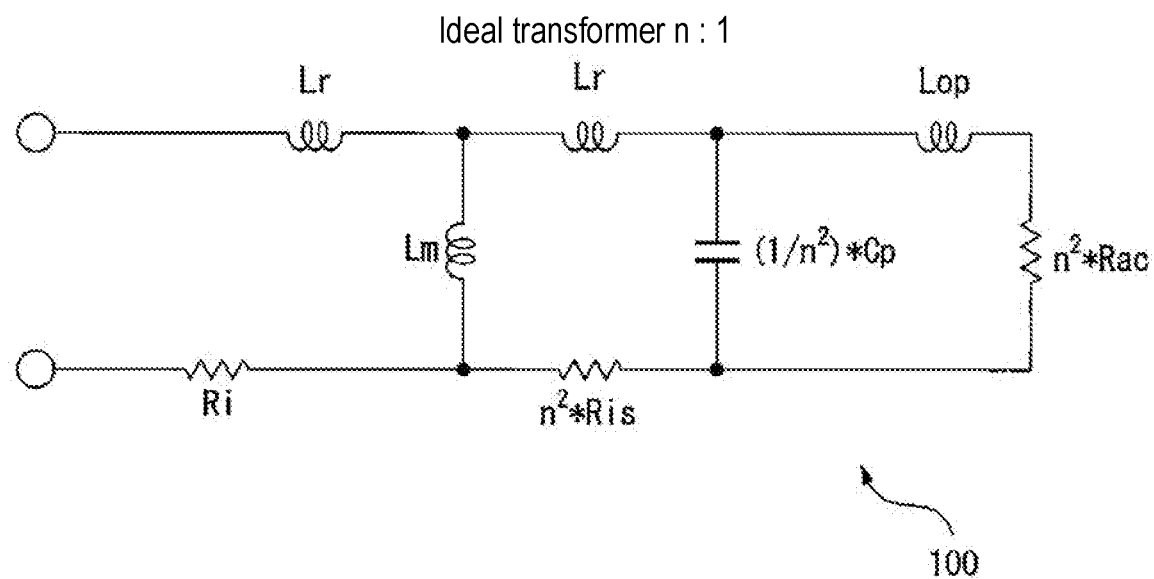
FIG. 3 is an equivalent circuit diagram of the noncontact power supply apparatus, showing when a resonance suppressing coil is opened.

FIG. 3 is an equivalent circuit diagram of the noncontact power supply apparatus 1 when the resonance suppressing coil 31 is opened. In this equivalent circuit 100, the transmitter coil 14 on the power-transmitter side and the receiver coil 21 of the resonance circuit 20 on the power-receiver side are coupled to form an n:1 ideal transformer. Lr and Lm denote a leakage inductance and exciting inductance of the transmitter coil 14 on the power-transmitter side, respectively. Note that when an inductance Lp of the transmitter coil 14 on the power-transmitter side is equal to (Lm+Lr), and a degree of coupling between the transmitter coil 14 and the receiver coil 21 is denoted by k, Lr=(1−k)Lp, and Lm=kLp are established". Further, Ri denotes a winding resistance value on the power-transmitter side, and Ris denotes a winding resistance value on the power-receiver side. Cp denotes a capacitance of the resonance capacitor 22 connected in parallel with the receiver coil 21 in the resonance circuit 20 on the power-receiver side. Lop denotes an inductance of the coil 23 connected in series with the receiver coil 21. Rac denotes an AC equivalent resistance value of the load circuit 27 and is represented by Rac=(8/$\pi^2$)*Ro.

Figure 4:
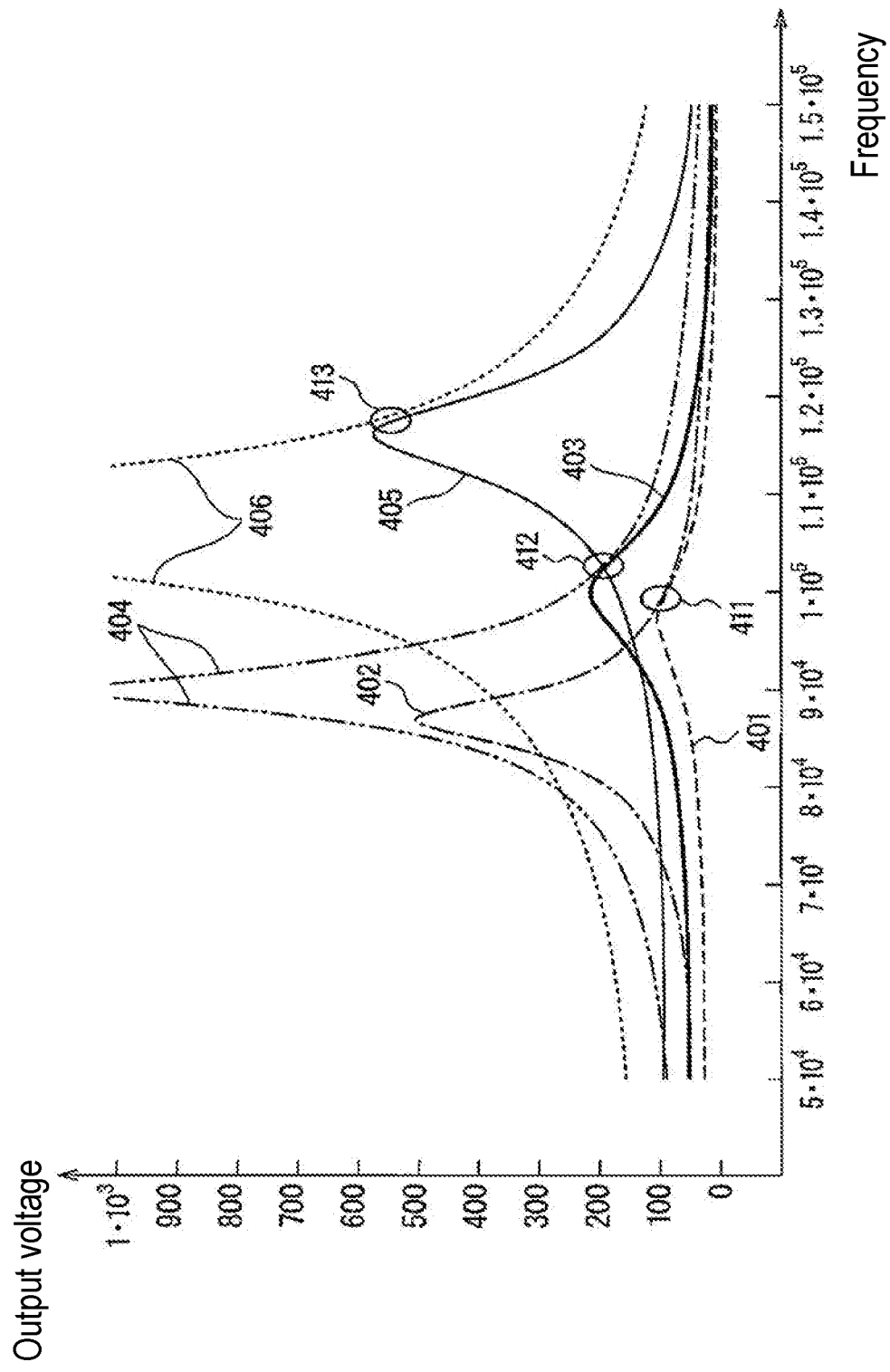
FIG. 4 is a diagram showing an example of a simulation result of frequency characteristics of output voltage of the noncontact power supply apparatus according to the embodiment.

FIG. 4 is a diagram showing an example of a simulation result of the frequency characteristics of the output voltage of the noncontact power supply apparatus 1 according to the embodiment. In FIG. 4, the horizontal axis represents frequency and the vertical axis represents output voltage. Note that, in this simulation, Lp=174 μH, Cp=20 nF, Lop=3 Lp, Ri=Ris=0.3Ω, n=1, Vin=200 V, and Ro=200Ω (Rac≈162.1Ω). A graph 401 represents frequency characteristics of the output voltage when the degree of coupling is k=0.15, and the AC equivalent resistance value of the load circuit 27 is Rac. Further, a graph 402 represents frequency characteristics of the output voltage when the degree of coupling k=0.15, and the AC equivalent resistance value of the load circuit 27 is (10*Rac). Further, a graph 403 represents frequency characteristic of the output voltage when the degree of coupling is k=0.3, and the AC equivalent resistance value of the load circuit 27 is Rac. Further, a graph 404 represents frequency characteristics of the output voltage when the degree of coupling is k=0.3, and the AC equivalent resistance value of the load circuit 27 is (10*Rac). Furthermore, a graph 405 represents frequency characteristics of the output voltage when the degree of coupling is k=0.6, and the AC equivalent resistance value of the load circuit 27 is Rac. Further, a graph 406 represents frequency characteristics of the output voltage when the degree of coupling is k=0.6, and the AC equivalent resistance value of the load circuit 27 is (10*Rac).

As shown in FIG. 4, a combination of a frequency and an output voltage where the output voltage becomes approximately constant (that is, becomes a constant voltage output) even when the AC equivalent resistance value of the load circuit 27 changes under the condition that the degree of coupling k has no change is present for each degree of coupling (three points 411 to 413 shown in FIG. 4). Therefore, even when AC power having a switching frequency at which the transmitter coil 14 does not resonate is applied to the transmitter coil 14, the noncontact power supply apparatus 1 can be put in the constant voltage output action against a change in the resistance value of the load circuit 27. Further, as indicated by the points 411 to 413, although output voltages that become constant against fluctuations in the resistance value of the load circuit 27 differ from each other in a manner that depends on the degree of coupling, adjusting the voltage applied to the transmitter coil 14 eliminates these differences and allows an approximately constant output voltage regardless of the degree of coupling.

Figure 5:
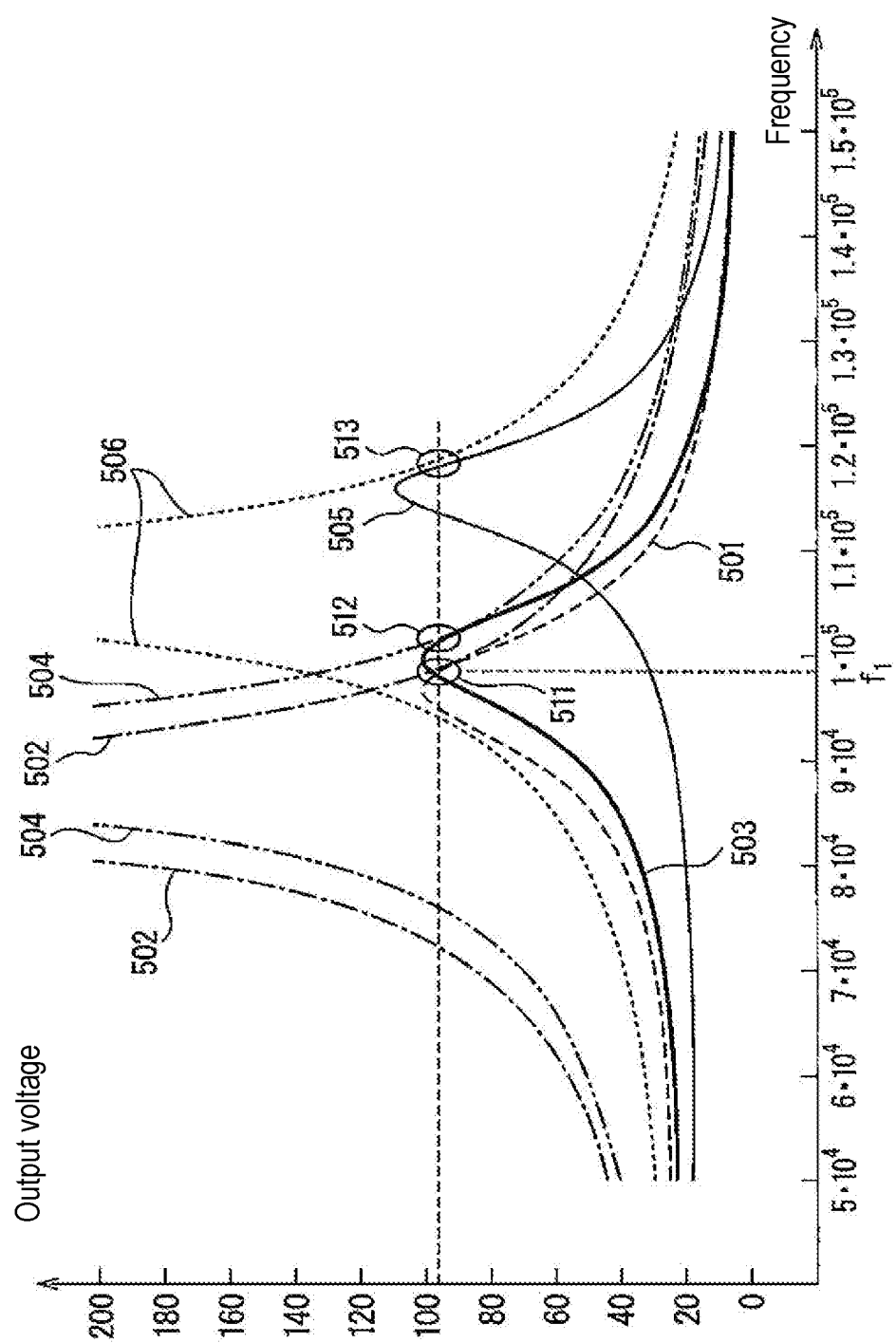
FIG. 5 is a diagram showing an example of a simulation result of frequency characteristics of output voltage when a voltage applied to a transmitter coil is changed in accordance with a degree of coupling in the simulation shown in FIG. 4.

FIG. 5 is a diagram showing an example of a simulation result of frequency characteristics of output voltage when a voltage applied to the transmitter coil 14 is changed in accordance with the degree of coupling in the simulation shown in FIG. 4. In FIG. 5, the horizontal axis represents frequency and the vertical axis represents output voltage. A graph 501 represents frequency characteristics of the output voltage when the degree of coupling is k=0.15, the AC equivalent resistance value of the load circuit 27 is Rac, and the voltage applied to the transmitter coil is Vin. Further, a graph 502 represents frequency characteristics of the output voltage when the degree of coupling is k=0.15, the AC equivalent resistance value of the load circuit 27 is (10*Rac), and the voltage applied to the transmitter coil is Vin. Further, a graph 503 represents frequency characteristics of the output voltage when the degree of coupling is k=0.3, the AC equivalent resistance value of the load circuit 27 is Rac, and the voltage applied to the transmitter coil is (0.47*Vin). Further, a graph 504 represents frequency characteristics of the output voltage when the degree of coupling is k=0.3, the AC equivalent resistance value of the load circuit 27 is (10*Rac), and the voltage applied to the transmitter coil is (0.47*Vin). Furthermore, a graph 505 represents frequency characteristics of the output voltage when the degree of coupling is k=0.6, the AC equivalent resistance value of the load circuit 27 is Rac, and the voltage applied to the transmitter coil is (0.19*Vin). Further, a graph 506 represents frequency characteristics of the output voltage when the degree of coupling is k=0.6, the AC equivalent resistance value of the load circuit 27 is (10*Rac), and the voltage applied to the transmitter coil is (0.19*Vin).

As shown in FIG. 4, a combination of a frequency and an output voltage where the output voltage becomes approximately constant (that is, becomes a constant voltage output) even when the AC equivalent resistance value of the load circuit 27 changes under the condition that the degree of coupling k has no change includes three points 511 to 513 corresponding to the points 411 to 413 shown in FIG. 4. The output voltages of the points 511 to 513 are approximately equal to each other.

As described above, the output voltage can be kept approximately constant by appropriately adjusting the switching frequency and voltage of the AC power applied to the transmitter coil 14 regardless of a change in the degree of coupling or the resistance value and of the load circuit 27.

Therefore, the control circuit 17 controls the switching frequency and voltage of the AC power applied to the transmitter coil 14 as described below in order to enable the constant voltage output action.

Upon receipt of the abnormal voltage occurrence information from the transceiver 15, the control circuit 17 reduces the voltage of the AC power applied to the transmitter coil 14 to a lower limit voltage. This reduces, even when the resonance suppressing coil 31 is opened, the output voltage from the resonance circuit 20 to the upper limit threshold or less on the power receiver device 3 side. Subsequently, when the determination information contained in the radio signal received from the power receiver device 3 via the transceiver 15 represents that the noncontact power supply apparatus 1 is not in the constant voltage output action, the control circuit 17 changes the switching frequency of the AC power within a predetermined frequency range. The predetermined frequency range may be, for example, a frequency range from a lower-limit frequency at which, when the power transmitter device 2 feeds power to the power receiver device 3, constant voltage output is made with a possible minimum degree of coupling between the transmitter coil 14 and the receiver coil 21 to an upper-limit frequency at which constant voltage output is made with a possible maximum degree of coupling between the transmitter coil 14 and the receiver coil 21.

When changing the switching frequency, the control circuit 17 may increase the switching frequency from the lower limit to upper limit of the predetermined frequency range, or alternatively, may lower the switching frequency from the upper limit to lower limit of the predetermined frequency range. At this time, the control circuit 17 preferably changes the switching frequency stepwise to maintain the same switching frequency for a period longer than a period in which the determination circuit 30 of the power receiver device 3 switches the switching element 29 to the on or off state, so as to allow the determination circuit 30 to check whether the output voltage becomes approximately constant.

When the determination information contained in the radio signal received from the power receiver device 3 via the transceiver 15 represents that the measured value of the output voltage is out of the allowable voltage range, but the output voltage becomes approximately constant even when the resistance of the load circuit changes, that is, the constant voltage output action is active, the control circuit 17 maintains the switching frequency constant thereafter. Then, the control circuit 17 refers to the reference table showing a relationship between a switching frequency and a duty cycle at which the switching element SW of the power factor correction circuit 12 is controlled to be switched to the on or off state to make the output voltage constant regardless of the degree of coupling at the switching frequency to determine the duty cycle. Then, the control circuit 17 controls the gate driver 16-1 to switch the switching element SW of the power factor correction circuit 12 to the on or off state in accordance with the duty cycle. This causes the voltage applied to the transmitter coil 14 to be adjusted such that the output voltage from the resonance circuit 20 is within the allowable voltage range, that is, a constant voltage is output regardless of the degree of coupling. Then, when the determination information contained in the radio signal received from the power receiver device 3 via the transceiver 15 represents that the measured value of the output voltage is within the allowable voltage range, the control circuit 17 maintains the switching frequency and voltage of the AC power supplied to the transmitter coil 14 constant.

Note that the control circuit 17 may gradually change the duty cycle, rather than referring to the above-described reference table to determine the duty cycle, until the determination information contained in the radio signal received from the power receiver device 3 via the transceiver 15 represents that the measured value of the output voltage is within the allowable voltage range.

Further, in order to increase energy transmission efficiency, it is preferable that the power supply circuit 10 and transmitter coil 14 of the power transmitter device 2 be kept in soft switching (inductive) action. In order to bring the power supply circuit 10 and the transmitter coil 14 into the soft switching action, it is preferable that the current flowing through the transmitter coil 14 be delayed in phase from the applied voltage. This causes a current to flow from the source terminal to drain terminal of the switching element 13-1 when the switching element 13-1 and the switching element 13-4 are switched to the on state, thereby bringing the power supply circuit 10 and the transmitter coil 14 into the soft switching action and thus suppressing the occurrence of switching loss.

As described above, when the output voltage from the resonance circuit of the power receiver device becomes equal to or greater than the upper limit threshold, this noncontact power supply apparatus short-circuits the resonance suppressing coil that can be electromagnetically coupled to the receiver coil of the resonance circuit to change the resonance frequency of the resonance circuit so as to reduce the power to be transmitted, and notifies the power transmitter device that the output voltage becomes equal to or greater than the upper limit threshold to change the switching frequency and voltage of the AC power applied to the transmitter coil of the power transmitter device so as to enable the constant voltage output action. Therefore, this noncontact power supply apparatus prevents the power receiver device or the load circuit from failing due to an excessive increase in the output voltage from the resonance circuit and allows continuous power transmission while suppressing energy loss.

According to the modification, in a power transmitter device 2, a power supply circuit that supplies AC power to a transmitter coil 14 may have a circuit structure different from the circuit structure according to the above-described embodiment, provided the power supply circuit is configured to variably adjust a switching frequency and a voltage applied to the transmitter coil 14.

Figure 6:
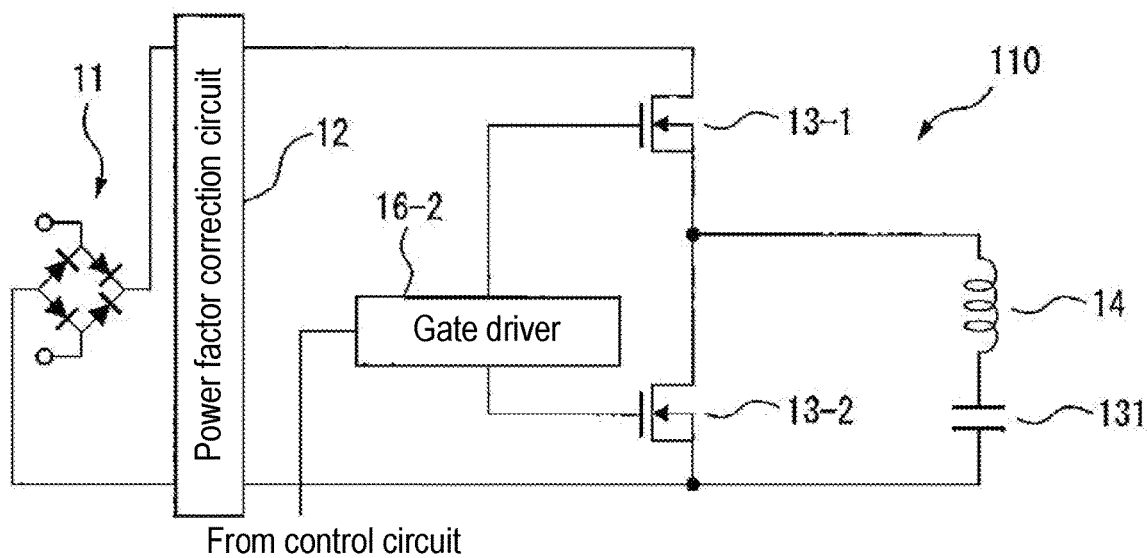
FIG. 6 is a circuit diagram of a power supply circuit according to a modification.

FIG. 6 is a circuit diagram of the power supply circuit according to the modification.

A power supply circuit 110 shown in FIG. 6 includes a power supply 11, a power factor correction circuit 12, two switching elements 13-1 and 13-2, and a capacitor 131 for interrupting a direct current that is connected in series with the transmitter coil 14. Note that, according to this modification as well, each of the switching elements may be, for example, an n-channel MOSFET. Further, the power factor correction circuit 12 may be the same as the power factor correction circuit 12 according to the above-described embodiment, for example.

According to this modification, the switching element 13-1 and the switching element 13-2 are connected in series between a positive electrode terminal and negative electrode terminal of the power supply 11. Further, the switching element 13-1 is connected to the positive electrode of the power supply 11, and the switching element 13-2 is connected to the negative electrode of the power supply 11. The switching element 13-1 has a drain terminal connected to the positive electrode terminal of the power supply 11 via the power factor correction circuit 12 and has a source terminal connected to a drain terminal of the switching element 13-2. Further, the switching element 13-2 has a source terminal connected to the negative electrode terminal of the power supply 11 via the power factor correction circuit 12. Further, the source terminal of the switching element 13-1 and the drain terminal of the switching element 13-2 are connected to one end of the transmitter coil 14, and the source terminal of the switching element 13-2 is connected to the other end of the transmitter coil 14 via the capacitor 131. Further, a gate terminal of each of the switching elements is connected to a gate driver 16-2.

According to this modification, the gate driver 16-2 may alternately switch the switching element 13-1 and the switching element 13-2 to the on or off state in accordance with a control signal from a control circuit. That is, when the switching element 13-1 is switched to the on state and the switching element 13-2 is switched to the off state, a current flows from the power supply 11 to the transmitter coil 14 via the power factor correction circuit 12 and the switching element 13-1 to charge the capacitor 131. On the other hand, when the switching element 13-1 is switched to the off state and the switching element 13-2 is switched to the on state, the capacitor 131 is discharged to cause a current to flow from the capacitor 131 via the transmitter coil 14 and the switching element 13-2. Therefore, according to this modification, the control circuit may control a switching frequency at which the switching element 13-1 and the switching element 13-2 are switched to the on or off state via the gate driver 16-2 in accordance with determination information received from the power receiver device 3.

Further, according to the above-described embodiment, as in the power supply circuit 110, a capacitor for interrupting a direct current connected in series with the transmitter coil 14 may be provided. However, in this case as well, in order to prevent the transmitter coil 14 and the capacitor from acting as a resonance circuit in the frequency range in which the switching frequency is adjusted, it is preferable that the capacitance of the capacitor be set such that the resonance frequency of the transmitter coil 14 and capacitor is lower than the resonance frequency of the resonance circuit 20 of the power receiver device 3 and the lower limit frequency of the frequency range in which the switching frequency is adjusted. This prevent the resonance on the transmitter side from being used in power transmission, so that, even when the degree of coupling between the transmitter coil 14 and the receiver coil 21 is small, a reduction in power transmission efficiency is suppressed. Further, even when the resonance suppressing coil 31 is short-circuited to suppress the resonance of the resonance circuit 20, the resonance on the transmitter side is not used, so that the input impedance becomes relatively large, and the current flowing through the transmitter coil 14 becomes small accordingly. As a result, energy loss is suppressed.

Further, according to the above-described embodiment or modification, a capacitor for interrupting a direct current may be provided between the receiver coil 21 and the coil 23.

Figure 7:
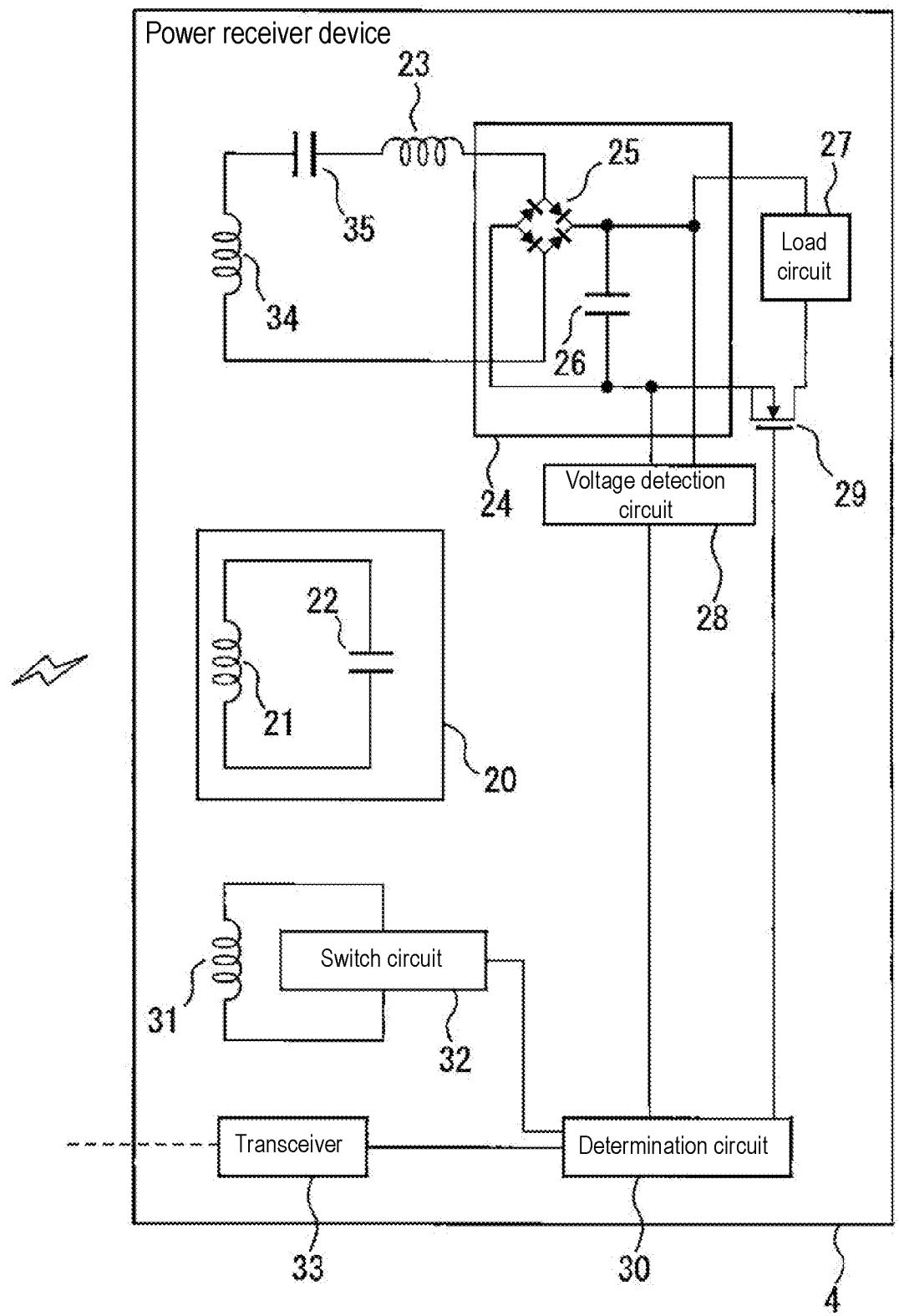
FIG. 7 is a structure diagram of a power receiver device according to another modification.

FIG. 7 is a structure diagram of a power receiver device 4 according to yet another modification. The power receiver device 4 includes a resonance circuit 20 including a receiver coil 21 and a resonance capacitor 22, a coil 23, a rectifying and smoothing circuit 24, a load circuit 27, a voltage detection circuit 28, a switching element 29, a determination circuit 30, a resonance suppressing coil 31, a switch circuit 32, a transceiver 33, an output coil 34, and a capacitor 35. The power receiver device 4 according to this modification is different from the power receiver device 3 according to the above-described embodiment in that the power receiver device 4 includes the output coil 34 and the capacitor 35 and in connection relationship between the resonance circuit 20 and the rectifying and smoothing circuit 24. Therefore, these differences and related matters will be described below.

According to this modification, the resonance circuit 20 is provided separately from the rectifying and smoothing circuit 24. In exchange, the output coil 34 is provided so as to be electromagnetically coupled to the receiver coil 21 of the resonance circuit 20. The capacitor 35 for interrupting a direct current is connected in series with the output coil 34 between the output coil 34 and the coil 23. The output coil 34 is connected to the rectifying and smoothing circuit 24 via the capacitor 35 and the coil 23. Note that the receiver coil 21 and the output coil 34 may be the same or different in the number of turns.

According to this modification as well, when power is transmitted from the power transmitter device 2 to the power receiver device 4, the current flowing through the transmitter coil 14 and the resonance circuit 20 resonate. However, according to this modification, the power thus transmitted is extracted from the output coil 34 electromagnetically coupled to the receiver coil 21 via the resonance circuit 20.

According to this modification as well, as in the above-described embodiment, the determination circuit 30 only needs to control the switch circuit 32 to short-circuit the resonance suppressing coil 31 when the measured value of the output voltage measured by the voltage detection circuit 28 becomes equal to or greater than the upper limit threshold and notify the power transmitter device 2 via the transceiver 33 of the abnormal voltage occurrence information. Accordingly, the power receiver device 4 according to this modification also prevents the power receiver device or the load circuit from failing due to an excessive increase in the output voltage from the resonance circuit and allows continuous power transmission while suppressing energy loss. Note that, according to this modification as well, upon receipt of the abnormal voltage occurrence information, the control circuit of the power transmitter device only needs to control the switching frequency and voltage of the AC power applied to the transmitter coil to allow the noncontact power supply apparatus to resume the constant voltage output action, as in the above-described embodiment.

Figure 8:
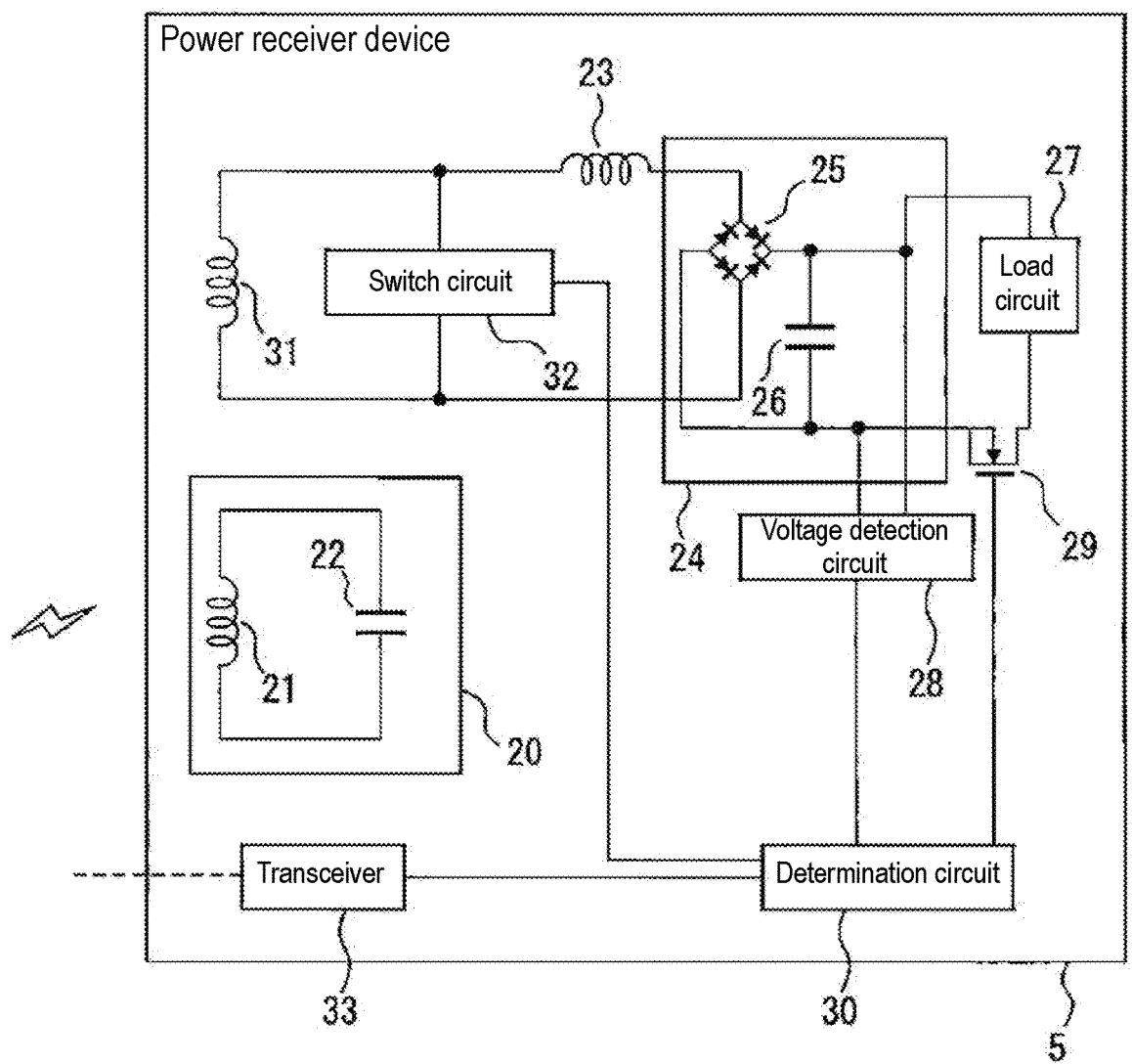
FIG. 8 is a structure diagram of a power receiver device according to yet another modification.

FIG. 8 is a structure diagram of a power receiver device 5 according to yet another modification. The power receiver device 5 according to this modification includes a resonance circuit 20 including a receiver coil 21 and a resonance capacitor 22, a coil 23, a rectifying and smoothing circuit 24, a load circuit 27, a voltage detection circuit 28, a switching element 29, a determination circuit 30, a resonance suppressing coil 31, a switch circuit 32, and a transceiver 33. The power receiver device 5 according to this modification is different from the power receiver device 3 according to the above-described embodiment in that the resonance suppressing coil 31 rather than the resonance circuit 20 is connected to the rectifying and smoothing circuit 24. Therefore, these differences and related matters will be described below.

According to this modification as well, the resonance circuit 20 is provided separately from the rectifying and smoothing circuit 24. In exchange, the resonance suppressing coil 31 provided so as to be electromagnetically coupled to the receiver coil 21 of the resonance circuit 20 is connected to the rectifying and smoothing circuit 24 via the coil 23. The switch circuit 32 has one end connected between one end of the resonance suppressing coil 31 and the coil 23 and has the other end connected to the other end of the resonance suppressing coil 31. Note that the receiver coil 21 and the resonance suppressing coil 31 may be the same or different in the number of turns.

According to this modification as well, when power is transmitted from the power transmitter device 2 to the power receiver device 5, the transmitter coil 14 and the resonance circuit 20 resonate. However, according to this modification, the power thus transmitted is extracted from the resonance suppressing coil 31 electromagnetically coupled to the receiver coil 21 via the resonance circuit 20.

According to this modification as well, as in the above-described embodiment, the determination circuit 30 only needs to control the switch circuit 32 to short-circuit the resonance suppressing coil 31 when the measured value of the output voltage measured by the voltage detection circuit 28 becomes equal to or greater than the upper limit threshold and notify the power transmitter device 2 via the transceiver 33 of the abnormal voltage occurrence information. Accordingly, the power receiver device 5 according to this modification also prevents the power receiver device or the load circuit from failing due to an excessive increase in the output voltage from the resonance circuit and allows continuous power transmission while suppressing energy loss. Note that, according to this modification as well, upon receipt of the abnormal voltage occurrence information, the control circuit of the power transmitter device only needs to control the switching frequency and voltage of the AC power applied to the transmitter coil to allow the noncontact power supply apparatus to resume the constant voltage output action, as in the above-described embodiment.

Note that, in the power receiver device 5, a capacitor for interrupting a direct current may be provided between the one end of the resonance suppressing coil 31 and the one end of the switch circuit 32. Alternatively, the capacitor for interrupting a direct current may be provided between the coil 23 and the one end of the switch circuit 32 connected to the one end of the resonance suppressing coil 31. In this case as well, the determination circuit 30 can change the resonance frequency of the resonance circuit 20 by controlling the switch circuit 32 to short-circuit the resonance suppressing coil 31, so that it is possible to reduce the power transmitted immediately when the measured value of the output voltage becomes equal to or greater than the upper limit threshold to prevent the power receiver device or the load circuit from failing.

According to yet another modification, the determination circuit 30 may include a timer circuit. In this case, the determination circuit 30 may cause the timer circuit to count an elapsed time from when the resonance suppressing coil 31 is short-circuited, and control the switch circuit 32 to open both the ends of the resonance suppressing coil 31 and start to switch the switching element 29 to the on or off state at the time when a predetermined period required for the control circuit 17 of the power transmitter device 2 to reduce the voltage of the AC power applied to the transmitter coil 14 has elapsed. Alternatively, the transceiver 15 of the power transmitter device 2 and the transceiver 33 of the power receiver device 3 may be configured to make bidirectional communication. In this case, the control circuit 17 of the power transmitter device 2 may notify the transceiver 33 of the power receiver device 3 via the transceiver 15 that the control circuit 17 has reduced the voltage of the AC power applied to the transmitter coil 14. Then, upon receipt of the notification via the transceiver 33 that the voltage of the AC power applied to the transmitter coil 14 has been reduced, the determination circuit 30 of the power receiver device 3 may control the switch circuit 32 to open both the ends of the resonance suppressing coil 31 and start to switch the switching element 29 to the on or off state. According to this modification as well, the noncontact power supply apparatus prevents the power receiver device or the load circuit from failing due to an excessive increase in the output voltage from the resonance circuit and allows continuous power transmission while suppressing energy loss.

According to yet another modification, the coil 23 connected between the resonance circuit 20 and the rectifying and smoothing circuit 24 and the switching element 29 may be omitted. In this case, upon receipt of the abnormal voltage occurrence information via the transceiver 15, the control circuit 17 of the power transmitter device 2 only needs to reduce the voltage of the AC power applied to the transmitter coil 14 so as to make the output voltage from the resonance circuit 20 less than the upper limit threshold. Further, in this case, the power supply circuit of the power transmitter device 2 may be any of various circuits configured to adjust the voltage of the AC power applied to the transmitter coil 14.

Further, when the transceiver 15 of the power transmitter device 2 and the transceiver 33 of the power receiver device 3 can be connected by wire, the transceiver 15 and the transceiver 33 each only need to include a communication circuit configured to make wired communication over which a signal containing the determination information or the like is communicated.

As described above, those skilled in the art may make various modifications according to the embodiments within the scope of the present invention.

DESCRIPTION OF SYMBOLS

1 noncontact power supply apparatus
2 power transmitter device
10, 110 power supply circuit
11 power supply
12 power factor correction circuit
13-1 to 13-4 switching element
14 transmitter coil
15 transceiver
16-1, 16-2 gate driver
17 control circuit
3, 4, 5 power receiver device
20 resonance circuit
21 receiver coil
22 capacitor
23 coil
24 rectifying and smoothing circuit
25 full-wave rectifying circuit
26 smoothing capacitor
27 load circuit
28 voltage detection circuit
29 switching element
30 determination circuit
31 resonance suppressing coil
32 switch circuit
33 transceiver
34 output coil
35 capacitor
131 capacitor

The invention claimed is:
1. A noncontact power supply apparatus comprising:
  a power transmitter device; and
  a power receiver device to which the power transmitter device transmits power in a noncontact manner, wherein the power transmitter device comprises:
- a transmitter coil configured to supply power to the power receiver device;
- a power supply circuit configured to supply AC power to the transmitter coil and adjust at least one of a switching frequency and voltage of the AC power supplied to the transmitter coil;
- a first transceiver configured to receive an output voltage abnormality signal from the power receiver device; and
- a control circuit configured to change, when the first transceiver receives the output voltage abnormality signal, at least one of the switching frequency and voltage of the AC power supplied from the power supply circuit to the transmitter coil, and the power receiver device comprises:
- a resonance circuit comprising a receiver coil configured to receive the power from the power transmitter device and a resonance capacitor connected in parallel with the receiver coil;
- a rectifying circuit configured to rectify the power received via the resonance circuit;
- a coil configured to reduce harmonic components of the received power, the coil connected at one end to the receiver coil and the capacitor and connected at another end to the rectifying circuit;
- a resonance suppressing coil disposed so as to be electromagnetically coupled to the receiver coil;
- a switch circuit connected to the resonance suppressing coil, the switch circuit being configured to switch the resonance suppressing coil to a short-circuited or opened state;
- a voltage detection circuit configured to measure an output voltage of power output from the rectifying circuit to obtain a measured value of the output voltage;
- a second transceiver configured to communicate with the first transceiver; and
- a determination circuit configured to control the switch circuit to short-circuit the resonance suppressing coil and cause the second transceiver to transmit the output voltage abnormality signal in response to the measured value of the output voltage becoming equal to or greater than a predetermined upper limit threshold.

2. The noncontact power supply apparatus according to claim 1, wherein the determination circuit of the power receiver device controls the switch circuit to open the resonance suppressing coil in response to the control circuit of the power transmitter device starting to change the at least one of the switching frequency and voltage of the AC power.

3. The noncontact power supply apparatus according to claim 1, wherein
the control circuit of the power transmitter device controls, in response to the first transceiver receiving the output voltage abnormality signal, the switching frequency of the AC power supplied from the power supply circuit to the transmitter coil so as to prevent the measured value of the output voltage from changing in response to a change in resistance of a load circuit connected to the rectifying circuit of the power receiver device.

4. The noncontact power supply apparatus according to claim 2, wherein
the control circuit of the power transmitter device controls, in response to the first transceiver receiving the output voltage abnormality signal, the switching frequency of the AC power supplied from the power supply circuit to the transmitter coil so as to prevent the measured value of the output voltage from changing in response to a change in resistance of a load circuit connected to the rectifying circuit of the power receiver device.

* * * * *